United States Patent [19]
Lill et al.

[11] Patent Number: 4,781,885
[45] Date of Patent: Nov. 1, 1988

[54] NUCLEAR REACTOR FUEL ASSEMBLY

[75] Inventors: Gunther Lill, Herzogenaurach; Rolf Holzer, Erlangen; Hans Lettau, Effeltrich, all of Fed. Rep. of Germany

[73] Assignee: Kraftwerk Union Aktiengesellschaft, Mülheim/Ruhr, Fed. Rep. of Germany

[21] Appl. No.: 926,970

[22] Filed: Nov. 4, 1986

[30] Foreign Application Priority Data

Nov. 14, 1985 [DE] Fed. Rep. of Germany ....... 3540466

[51] Int. Cl.$^4$ .............................................. G21C 3/32
[52] U.S. Cl. .................................... 376/444; 376/443
[58] Field of Search ........................ 376/444, 443, 441

[56] References Cited

U.S. PATENT DOCUMENTS

| | | | |
|---|---|---|---|
| 4,675,154 | 6/1987 | Neuson | 376/444 |
| 4,686,079 | 8/1987 | Ishikawa | 376/444 |

FOREIGN PATENT DOCUMENTS

| | | | |
|---|---|---|---|
| 0086427 | 8/1983 | European Pat. Off. | |
| 2261863 | 12/1972 | Fed. Rep. of Germany | 376/444 |
| 1276233 | 10/1961 | France | |
| 2166089 | 8/1973 | France | |
| 5250498 | 4/1977 | Japan | 376/444 |

OTHER PUBLICATIONS

Asea Journal 3-84; pp. 3-7.

*Primary Examiner*—Donald P. Walsh
*Attorney, Agent, or Firm*—Herbert L. Lerner; Laurence A. Greenberg

[57] ABSTRACT

A nuclear reactor fuel assembly includes an elongated fuel channel with a square cross section and channel walls, the fuel channel having an imaginary lattice disposed therein with a box-shaped cross section having mesh openings and sides parallel to the channel walls, fuel rods containing nuclear fuel being mutually spaced apart in the mesh openings, and a prismatic water pipe spaced apart from the fuel channel by a given spacing and having a cross section spanning more than one of the mesh openings of the imaginary lattice, the given spacing being completely filled with the mesh openings of the imaginary lattice and the fuel rods disposed therein.

6 Claims, 2 Drawing Sheets

NUCLEAR REACTOR FUEL ASSEMBLY

The invention relates to a nuclear reactor fuel assembly including an elongated fuel channel with a square cross section and channel walls, the fuel channel having an imaginary lattice disposed therein with a box-shaped cross section having mesh openings and sides parallel to the channel walls, fuel rods containing nuclear fuel being mutually spaced apart in the mesh openings, and a water pipe spaced apart from the fuel channel by a given spacing and having a cross section spanning more than one of the mesh openings of the imaginary lattice, the given spacing being completely filled with the mesh openings of the imaginary lattice and the fuel rods disposed therein.

A nuclear reactor fuel assembly of this type is known from U.S. Pat. No. 3,808,098. The known nuclear reactor fuel assembly is intended for a boiling water reactor. The water pipe thereof is a hollow cylinder and is not centrally disposed in the imaginary lattice. The water pipe forms an internal channel in the fuel assembly, through which water flows that does not boil over the entire length of the fuel assembly in the boiling water reactor. As a result, the water in the water pipe causes a better distribution of the flux of thermal neutrons and thus brings about improved reactivity in the reactor core of the boiling water reactor.

In the prior art nuclear reactor fuel assembly, some subsidiary flow channels in the longitudinal direction of the fuel assembly have a different cross section from other subsidiary flow channels, which are formed only by the interspace between adjoining fuel rods. Such flow channels are formed by the intermediate space between the water pipe and adjoining fuel rods and in a boiling water reactor, a water and steam mixture flows through them in the longitudinal direction of the fuel assembly. The difference in the cross sections becomes greater as the size of the cross section of the water pipe and the the number of mesh openings or apertures of the imaginary lattice or grid encompassed by this cross section increases. Because of this difference in cross sections, the water-steam mixture flowing through the nuclear reactor fuel assembly is not uniformly distributed, which results in uneven cooling of the fuel rods of the fuel assembly.

It is accordingly an object of the invention to provide a nuclear reactor fuel assembly which overcomes the hereinafore-mentioned disadvantages of the heretofore-known devices of this general type and to make the cooling of the fuel rods uniform.

With the foregoing and other objects in view there is provided, in accordance with the invention, a nuclear reactor fuel assembly, comprising an elongated fuel channel with a square cross section and channel walls, the fuel channel having an imaginary lattice disposed therein with a box-shaped cross section having mesh openings and sides parallel to the channel walls, fuel rods containing nuclear fuel being mutually spaced apart in the mesh openings, and a prismatic water pipe spaced apart from the fuel channel by a given spacing and having a cross section spanning more than one of the mesh openings of the imaginary lattice, the given spacing being completely filled with the mesh openings of the imaginary lattice and the fuel rods disposed therein.

The cross-sectional outline of the prismatically constructed water pipe which is defined by straight lines, makes it possible to dimension the cross section of subsidiary flow channels which are partly defined by the water pipe in such a way that a largely uniform cooling of all of the fuel rods in the nuclear reactor fuel assembly is attained.

Moreover, the prismatically constructed water pipe is capable of effecting a more uniform distribution of water, which acts as the moderator substance, and nuclear fuel, and thus of increasing the reactivity of the boiling water reactor.

Pages 4–7 of the ASEA Journal, 3/84, do disclose a water pipe disposed in the center of a nuclear reactor fuel assembly for a boiling water reactor, which is a hollow body having a cross-shaped cross section. However, this hollow body is not spaced apart from the elongated fuel channel; instead, its longitudinal edges are welded directly to the inside of the fuel channel. As a result, although relatively uniform cooling of the fuel rods in the fuel assembly is attained, nuclear fuel and water are nevertheless unevenly distributed in the reactor core of the boiling water reactor, since a majority of the water in the water pipe having the cross-shaped cross section is located on the inner surfaces of the fuel channel, while in the reactor core of the boiling water reactor, water is already present as the moderator substance, on the outer surfaces of the fuel channel.

The nuclear reactor fuel assembly according to the invention not only provides uniform cooling of the fuel rods and increased reactivity in the boiling water reactor, but it also has the further advantage of permitting the fuel assembly components, such as spacers, fuel assembly top fitting and fuel assembly base to be adapted to the water pipe without special expense. No adaptation of the fuel channel, of any kind whatsoever, is needed.

In accordance with another feature of the invention, the water pipe is centrally disposed in the imaginary lattice.

In accordance with a further feature of the invention, the cross section of the water pipe is square.

In accordance with an added feature of the invention, the cross section of the fuel channel has cross-sectional sides, the cross section of the water pipe is square and has cross-sectional sides, the cross-sectional sides of the water pipe are each parallel to a respective cross-sectional side of the fuel channel, and the cross-sectional sides of the water pipe are each spaced apart from a respective one of the cross-sectional sides of the fuel channel by the same distance.

In accordance with a concomitant feature of the invention, the imaginary lattice (10, 11) has $n \times n$ mesh openings, where n 8, the cross section of the central water pipe spanning $(n-6) \times (n-6)$ mesh openings leaving remaining mesh openings between the water pipe and the fuel channel being occupied solely by fuel rods.

These advantageous embodiments of the nuclear reactor fuel assembly provide better symmetry in the distribution of the moderator substance in the form of water and of the fuel in the reactor core of the boiling water reactor and therefore permit more uniform distribution of the enrichment with fissionable isotopes in the fuel rods of the nuclear reactor fuel assembly.

Other features which are considered as characteristic for the invention are set forth in the appended claims.

Although the invention is illustrated and described herein as embodied in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
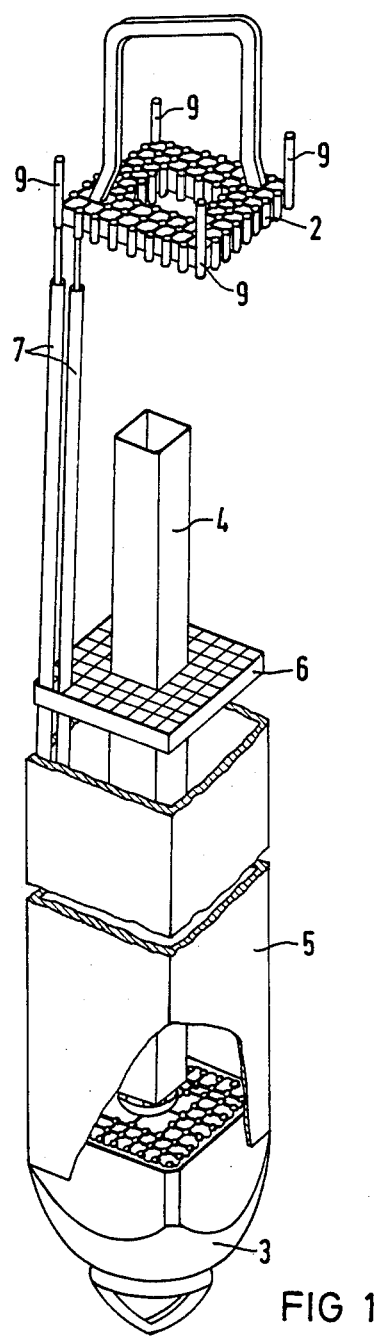
FIG. 1 is a fragmentary, diagrammatic, partially exploded and partially broken away perspective view of a skeleton of a nuclear reactor fuel assembly according to the invention.
Figure 4:
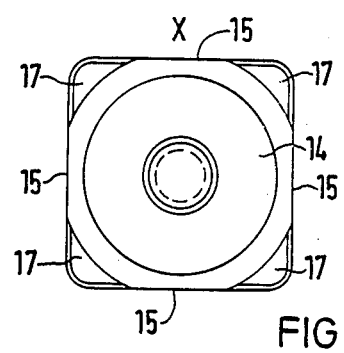
FIG. 4 is a bottom-plan view of the water pipe.

Referring now to the figures of the drawings in detail and first, particularly, to FIG. 1 thereof, there is seen a nuclear reactor fuel assembly having a fuel assembly top fitting 2 and a fuel assembly base 3 each having a square cross section, an elongated prismatic water pipe or water channel box 4 with a square cross section, and an elongated fuel channel 5 having a square cross section. The water pipe 4 is centrally disposed in lattice or grid-like spacers 6, which are spaced apart from one another, when viewed in the longitudinal direction of the water pipe 4. Each mesh opening or aperture in the lattice formed by these spacers 6 is penetrated by a fuel rod 7 containing nuclear fuel. For example, eight of the fuel rods 7 may be so-called supporting rods, which have threaded bolts at both ends with which they are firmly screwed to the fuel assembly top fitting 2 or base 3. The other fuel rods 7 pass loosely through openings in the fuel assembly top fitting 2 and the fuel assembly base 3, with bolts located on both ends thereof. The fuel rods are each fixed in place with a compression biased helical spring. The springs are seated on the bolts engaged in the openings in the fuel assembly top fitting 2 on the inner surface of the fuel assembly top fitting 2 and they are supported on the inner surface and on the associated fuel rod.

While the fuel assembly top fitting 2 and base 3 are formed of stainless steel, the elongated fuel channel 5 is fabricated from a zirconium alloy. The fuel channel is open at both ends and encompasses the fuel assembly top fitting 2 and the fuel assembly base 3. The upper end of the fuel channel has non-illustrated sheet metal strips inside the corners thereof, which are firmly screwed at the upper end of stay bolts 9 to the top of the fuel assembly top fitting 2.

Figure 2:
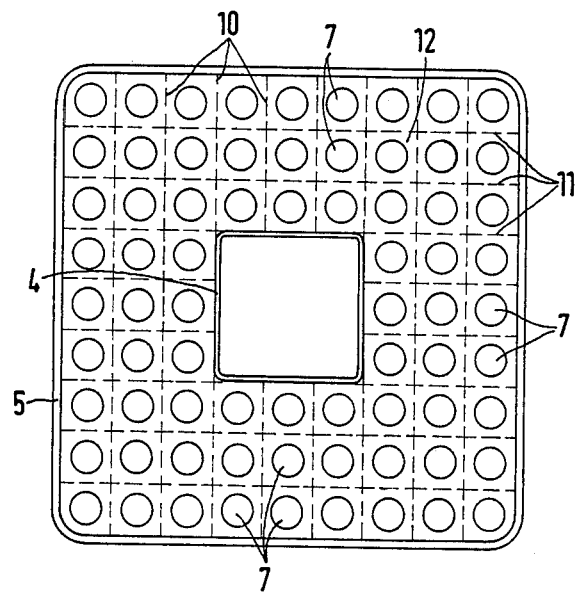
FIG. 2 is a cross-sectional view of a fuel channel shown in FIG. 1.

As shown in FIG. 2, an imaginary lattice or grid is symbolized by broken lines 10 and 11 in a cross section of the fuel channel. The lines 10 and 11 are at right angles to one another and form spaces of equal volume surrounding each fuel rod or square mesh openings or apertures 12, which are rectangular at the inside of the fuel channel, in the imaginary lattice or grid in the cross section of the fuel channel. All of the lines 10 that are parallel to one another are parallel to one pair of sides of the cross section of the fuel channel, and all of the lines 11 that are parallel to one another are parallel to the other pair of sides pair of the cross section. The lattice or grid formed by the lines 10 and 11 has nine mesh openings or apertures 12 on each side of the cross section, or in other words the imaginary lattice or grid has a total of 9×9 mesh openings or apertures.

The water pipe 4 is centrally disposed in the imaginary lattice or grid having the lines 10 and 11 and nas a square cross section. The cross-sectional sides of the water pipe are parallel to the associated adjoining cross-sectional side of the fuel channel 5. All of the cross-sectional sides of the water pipe 4 are spaced apart from the associated adjoining cross-sectional side of the fuel channel 5 by the same distance.

The cross section of the water pipe 4 encompasses 3×3 mesh openings or apertures in the center of the imaginary lattice or grid. There are a total of 72 mesh openings or apertures of the imaginary lattice or grid located on all of the outer surfaces of the water pipe 4, between the water pipe 4 and the fuel channel 5, and one fuel rod 7 containing nuclear fuel is disposed in each of the mesh openings or apertures. Adjoining fuel rods 7 are spaced apart from one another by the same distances.

Figure 3:
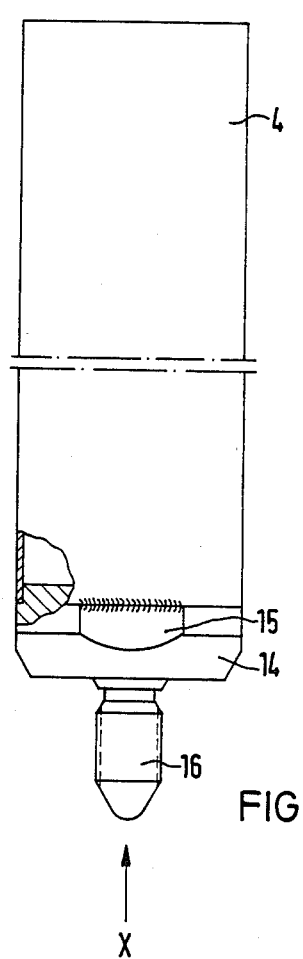
FIG. 3 is a partially broken away, side-elevational view of a water pipe of the fuel assembly of FIG. 1.

As FIG. 3 shows, the water pipe 4 has an open upper end and a lower end which fits over a bottom part 14 having a circular cross section. The surface or shell of the bottom part 14 has four planar locations 15, each of which is spaced apart from the next by an angle of 90° and is firmly welded to the water pipe 4.

The underside or lower surface of the stainless steel bottom part 14 has a threaded bolt 16. The threaded bolt passes through an opening in the lattice-like grating on top of the fuel assembly base 3 and is firmly screwed to the fuel assembly base 3 with a non-illustrated nut.

At the lower end of the water pipe 4, which is likewise fabricated from a zirconium alloy, the bottom part 14 forms four passage openings 17 for water, each being disposed between two respective planar locations 15 at the corners of the cross section of the water pipe 4. In a boiling water nuclear reactor, the water flows through the water pipe 4 from the fuel assembly base 3 toward the fuel assembly top fitting 2; the water does not evaporate in the water pipe 4 but leaves the water pipe 4 again at the upper end thereof.

In a boiling water reactor, the water flowing through the nuclear reactor fuel assembly inside the fuel channel 5 on the outer surface of the water pipe 4 from the fuel assembly base 3 to the top fitting 2 enters the fuel channel 5 through the fuel assembly base 3, partly evaporates at the outside of the fuel rod 7, and finally leaves the fuel channel 5 in the form of a water and water vapor mixture through the fuel assembly top fitting 2.

The foregoing is a description corresponding in substance to German application P No. 35 40 466.3, dated Nov. 14, 1985, the International priority of which is being claimed for the instant application, and which is hereby made part of this application. Any material discrepancies between the foregoing specification and the aforementioned corresponding German application are to be resolved in favor of the latter.

We claim:

1. Nuclear reactor fuel assembly, comprising a fuel assembly top fitting having a square cross section, a fuel assembly base having a square cross section, an elongated fuel channel with a square cross section and channel walls, fuel rods containing nuclear fuel and an elongated prismatic water channel box both being disposed in said fuel channel in a spacing configuration defined by a lattice having mesh openings with sides parallel to said channel walls, said fuel rods being mutually spaced apart in said mesh openings, said water channel box having a cross section spanning more than one of said mesh openings, and said water channel box being spaced apart from said fuel channel by an interspace being completely filled with said mesh openings and said fuel rods disposed therein.

2. Nuclear reactor fuel assembly according to claim 1, wherein said water pipe is centrally disposed in said lattice.

3. Nuclear reactor fuel assembly according to claim 1, wherein said cross section of said water channel box is square.

4. Nuclear reactor fuel assembly according to claim 2, wherein said cross-section of said fuel channel has cross-section sides, said cross-section of said water channel box is square and has cross-sectional sides, said cross-sectional sides of said water channel box are each parallel to a respective cross-sectional side of said fuel channel, and said cross-sectional sides of said water channel box are each spaced apart from a respective one of said cross-sectional sides of said fuel channel by the same distance.

5. Nuclear reactor assembly according to claim 4, wherein said lattice has $n \times n$ mesh openings, where $n \geq 8$, said cross section of said central water channel box spanning $(n-6) \times (n-6)$ mesh openings leaving remaining mesh openings between said water channel box and said fuel channel being occupied solely by fuel rods.

6. Nuclear reactor fuel assembly, comprising an elongated fuel channel with a square cross section, fuel rods containing nuclear fuel being mutually spaced apart in an array in said fuel channel, each of said fuel rods being surrounded by a space with a substantially equal volume, and a prismatic water channel box having a cross section spanning more than one of said spaces, said water channel box and said fuel channel being mutually spaced apart defining a region therebetween being completely filled with said spaces and said fuel rods disposed therein.

* * * * *